United States Patent [19]

Spater

[11] 4,115,317
[45] Sep. 19, 1978

[54] METHOD AND APPARATUS FOR REGENERATING AND MANUFACTURING ACTIVATED CARBON

[75] Inventor: Stuart S. Spater, Livingston, N.J.

[73] Assignee: Nichols Engineering & Research Corporation, Belle Mead, N.J.

[21] Appl. No.: 783,381

[22] Filed: Mar. 31, 1977

Related U.S. Application Data

[63] Continuation-in-part of Ser. No. 609,630, Sep. 2, 1975, abandoned.

[51] Int. Cl.² .................... B01J 21/18; C01B 31/10
[52] U.S. Cl. ........................... 252/418; 422/168;
    422/232; 201/33; 202/100; 252/420; 252/421;
    252/445; 432/72; 432/151; 432/152
[58] Field of Search ............... 252/421, 445, 411, 418,
    252/420; 423/449; 201/15, 27, 29, 33, 34;
    23/277 C; 432/72, 151, 152

[56] References Cited

U.S. PATENT DOCUMENTS

| 2,616,858 | 11/1952 | Gillette et al. | 252/418 |
| 3,153,633 | 10/1964 | von Dreushe, Jr. | 252/421 |

FOREIGN PATENT DOCUMENTS

| 1,307,739 | 2/1973 | United Kingdom | 201/15 |
| 116,076 | 2/1958 | U.S.S.R. | 201/27 |

Primary Examiner—P. E. Konopka
Attorney, Agent, or Firm—Fitzpatrick, Cella, Harper & Scinto

[57] ABSTRACT

This invention relates to a system for regenerating and manufacturing activated carbon wherein the exhaust gases and vapors from the upper portion of a multiple hearth furnace are passed to a gas cooling apparatus such as a quencher or scrubber, the clean gases from which system are exhausted and from which a slip stream of water saturated gases are conducted to a lower hearth portion of the furnace for reaction with the carbon in the furnace.

8 Claims, 2 Drawing Figures

METHOD AND APPARATUS FOR REGENERATING AND MANUFACTURING ACTIVATED CARBON

This is a continuation-in-part of application Ser. No. 609,630 filed Sept. 2, 1975, now abandoned.

BACKGROUND OF THE INVENTION

1. Field of the Invention

This invention relates to the regeneration and manufacture of activated carbon, and more particularly to the regeneration and manufacture of activated carbon adsorbents in a multiple hearth furnace system.

2. Description of the Prior Art

Heretofore, it was known to recycle the gases between various zones in a multiple hearth furnace. For example, in the Gillette, et al. U.S. Pat. No. 2,616,858 issued Nov. 4, 1952, there is disclosed means for recycling gases from the second to the third heating zone. This patent suggested that the steam found in the recycled gas has a beneficial effect and constituted about 15 to 20% of the gas mixutre introduced to the hearth. However, it will be noted that this patent is directed to the regeneration of bone char, wherein the composite consists of about 90% by weight of porous mineral matter, with about 10% carbon disposed throughout. Because of its porous mineral structure, local overburning of the carbon in the bone char is minimized. Moreover, the bone char has a limited capacity to adsorb organic matter. Consequently, it was of little importance whether in any one pass, the organic material was converted to coke rather than being burned in the regenerative process.

In contrast with this, the present invention is directed to the regeneration or manufacture of granulated activated carbon, wherein the main constituent is carbon, i.e. 45 to 95%, from which must be burned the material adsorbed in the fine pores, or present in the carbonaceous starting material which give the carbon its activity. To this end, the quantity of steam ($H_2O$) which is available for reactions with the carbon should be on the order of about six times the quantity of carbon gasified. It is therefore apparent that if recycled gas is used, it must contain sufficient steam to allow for the proper regeneration of the activated carbon and, consequently, cannot be obtained according to the method of the aforesaid Gillette patent.

Prior to the disclosure of the present invention, recycled gases were taken directly from the top portion of the furnace through a recycle fan and passed into a combustion chamber. The combustion chamber exhaust gases then entered the bottom portion of the furnace. This provided added means for control of the temperature and atmosphere. Combustion gases of very low oxygen content are thus evolved without excessively high temperatures. Such a method is disclosed in the Charles F. von Dreusche, Jr. Pat. No. 3,153,633 issued Oct. 20, 1964. In certain installations, it was found that such a recycle system resulted in severe maintenance problems which had their source in the elevated temperatures, which are of the order of from about 600° F. to about 1600° F., for example, and in many cases entrained particulate matter and tars. The temperature itself required special recycle fans which are normally high maintenance items. In some cases, the normal operating conditions of the furnace were upset and the temperature would rise to levels for which the recycle fans, ducts and dampers were not designed, resulting in rapid failure of these parts. In addition, the tars and particulate matter adhered to the duct work and fans. This build-up on the fans caused them to become unbalanced, thereby resulting in excessive wear of the bearings. Because of these inherent problems of the recycle system, it became necessary to inject steam directly into the activation zones of the multiple hearth furnace from an outside source, requiring a boiler. Since the cost of fuel has risen dramatically over the past few years, this is an inherent economic disadvantage.

It will be appreciated that with the advent of stringent air pollution bodes, afterburners and scrubbers are now generally required. As a result, over the past few years most of the newer active carbon regeneration and manufacturing systems have installed wet scrubbers to remove the particulate matter from the exhaust gases.

SUMMARY OF THE INVENTION

In view of the foregoing, it is an object of this invention to supply water vapors in such a manner as to be economically advantageous for use with existing multiple hearth furnaces used for the regeneration or production of activated carbon. It is a further object of this invention to supply sufficient water vapor, both for the necessary reaction in which it is involved, and also for temperature control. Another object of the invention is to obviate the need for costly external boilers to supply the necessary water vapor.

It will be appreciated that the present invention involves a novel combination of features combined in such a way as to afford a very efficient and effective solution to the aforesaid difficulties encountered with the prior art, as will become apparent as the description proceeds.

In order to accomplish the desired results, I provide a new and improved system for regenerating or manufacturing activated carbon, which is characterized by the combination of a multiple hearth furnace, gas cooling apparatus such as a scrubber or quencher, and means for passing the hot exhaust gases and vapors from the upper portion of the furnace to the gas cooling apparatus. Means are provided for withdrawing gases from the gas cooling apparatus and means are also provided for withdrawing a slip stream of water saturated gases from the gas cooling apparatus and conducting them to a lower portion of the furnace, thereby providing a recycle gas system wherein water vapor from the gas cooling apparatus is used for reaction with the carbon in the furnace. It will be understood that the cooling apparatus is equipped to introduce moisture or water to the furnace exhaust gases.

In one form of the invention, the furnace is provided with an external combustion chamber and the slip stream of water saturated gases from the cooling apparatus are conducted to this combustion chamber, which then combines the gaseous products of fuel combustion with the slip stream of water saturated gases and introduces the mixture to the lower hearth area of the furnace. In another form of the invention, burner means are provided for directly firing the lower hearths of the furnace.

According to a further aspect of the invention, an afterburner is provided in the upper portion of the furnace, wherein the combustion process is completed with the assist of burner means, and means are provided for passing the exhaust gases and vapors produced in the afterburner to the cooling apparatus means. In another form thereof, the invention provides an external afterburner for receiving the exhaust gases and vapors from the upper portion of the multiple hearth furnace, and means are provided for passing these gases and vapors to the cooling apparatus.

The gas cooling apparatus may include a saturated quencher or scrubber, the latter of which not only acts to cool or quench the furnace exhaust gases, but also to remove particulates therefrom. Thus, I may employ a saturated scrubber so that the exhaust gases and vapors from the afterburner are delivered to the scrubber as stated where particulate matter in the entering gases are trapped in water. Clean gases are withdrawn from the scrubber and a slip stream of water saturated cooled gases are also drawn from the scrubber and delivered to a lower portion of the furnace or to the external combustion chamber, as the case may be, so that the water is available to react with the carbon in the furnace. Alternatively, I may employ a saturated quencher in cases where removal of particulates from the furnace exhaust gases is not necessary. In either case, the furnace exhaust gases are cooled to a temperature at which they are adiabatically saturated so as to carry their maximum moisture content when reentering the furnace or external combustion chamber.

There has thus been outlined rather broadly the more important features of the invention in order that the detailed description thereof that follows may be better understood, and in order that the present contribution to the art may be better appreciated. There are of course additional features of the invention that will be described more fully hereinafter. Those skilled in the art will appreciate that the conception on which this disclosure is based may be utilized as the basis for the designing of other systems and methods for carrying out the several purposes of this invention. It is important, therefore, that this disclosure be regarded as including such equivalent systems and methods as do not depart from the spirit and scope of the invention.

BRIEF DESCRIPTION OF THE DRAWINGS

Several embodiments of the invention have been chosen for purposes of illustration and description, and are shown in the accompanying drawings forming a part of the specification, wherein.

DESCRIPTION OF THE PREFERRED EMBODIMENTS

Figure 1:
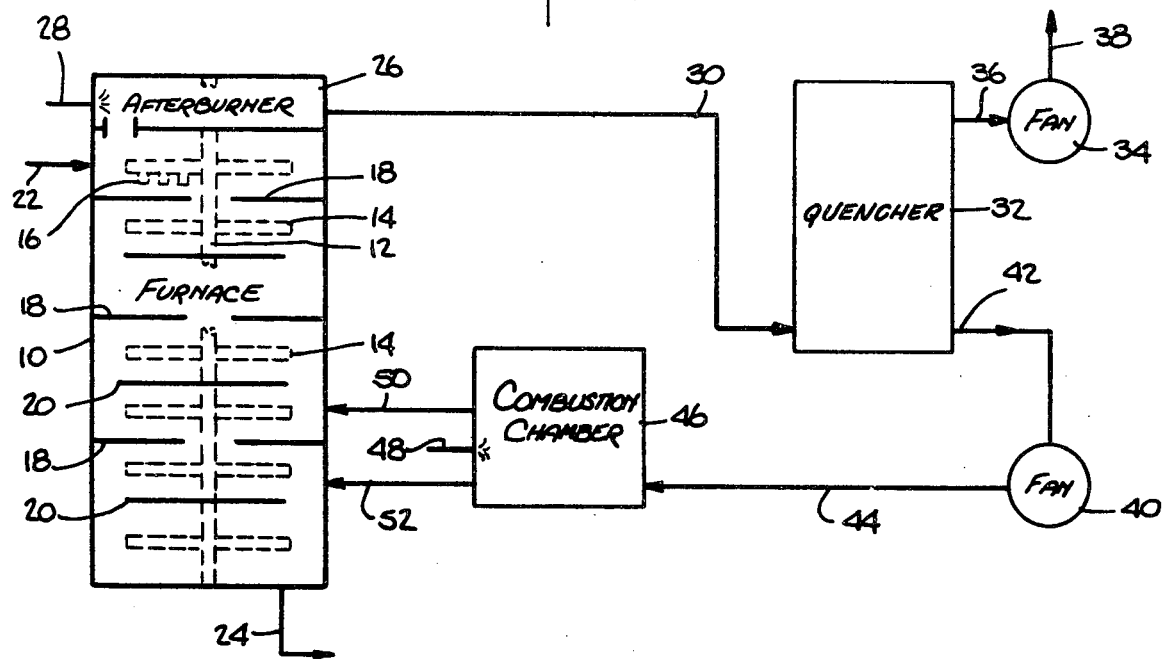
FIG. 1 is a schematic diagram showing a system for regenerating and manufacturing activated carbon, according to the concepts of this invention.

In the embodiment of the invention illustrated in FIG. 1, there is provided a multiple hearth furnace 10, which may be, for example, of the well known Herreschoff type having a central rotatable shaft 12 carrying rabble-arms 14 extending out over each hearth and all carrying rabble-teeth as indicated at 16, for periodically agitating and gradually advancing the material over each hearth. Alternate hearths are formed with central and peripheral discharge openings as at 18 and 20, respectively, so that the material may be rabbled across each hearth and fall from hearth-to-hearth down through the furnace. The granular activated carbon to be processed is fed into the top of the furnace, as indicated at 22, and the finished material ultimately is discharged from the lower portion of the furnace, as indicated at 24.

The furnace, as illustrated in FIG. 1, is preferably provided with an afterburner 26 disposed at the top thereof, wherein the combustion process is completed with the assist of burner means, indicated generally at 28. The exhaust gases and vapors produced in the afterburner 26 are led, via line 30, to cooling apparatus 32, which may be of any suitable type, such as a venturi type, for example. An induced draft fan 34 is fitted to the apparatus 32 by line 36 to discharge clean gases therefrom as at 38. A recycle fan 40 is used to conduct a slip stream of water saturated gases from the apparatus, through a water vapor recycle line as indicated at 42, through a line 44 to a combustion chamber 46, fitted with burner means 48.

A saturated quencher of a type suitable for the present purpose is commercially available from Sonic Development Corp. of Upper Saddle River, New Jersey. Where such apparatus is employed, the slip stream of water saturated gases from the quencher becomes uniformly mixed in the combustion chamber with the gaseous products of fuel combustion, and the mixture is then introduced to the lower hearth portion of the furnace 10 via lines 50 and 52, thereby completing the recycling system. It will thus be seen that the stream of water vapor, provided by the quencher, is made available for reaction with the carbon in the furnace 10, whereby the total overall heat requirements are reduced because no outside steam is required.

As already mentioned, a scrubber such as a venturi scrubber may be employed in lieu of the quencher, especially if it is deemed desirable to remove particulates from the hot gases. Suitable scrubbers which can provide adiabatically saturated gases are commercially available from Swemco of New York, N.Y.

Figure 2:
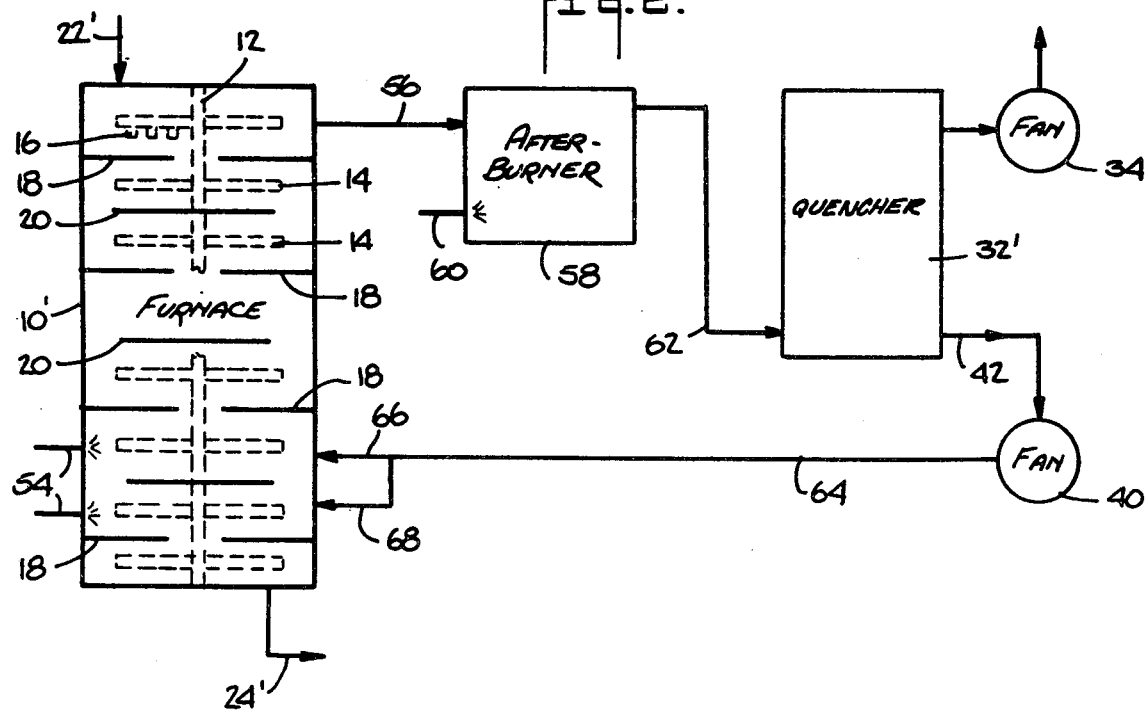
FIG. 2 is a schematic diagram similar to FIG. 1, showing a second embodiment of the invention.

In the embodiment of the invention illustrated in FIG. 2, the furnace 10' is also provided with a central rotatable shaft, rabble arms and an alternate hearth arrangement, which is the same as that described hereinbefore in connection with the embodiment of FIG. 1. However, in this embodiment there is no afterburner mounted on the top of the furnace and, hence, the granular activated carbon to be processed is fed into the furnace from the top, as at 22'. Further, in this embodiment, there is no outside combustion chamber and, hence, the lower hearths are directly fired by burner means 54, provided for the purpose. Again, the so processed material ultimately is discharged from the bottom of the furnace, as indicated at 24'.

The recycling system employed in the embodiment of FIG. 2, comprises a line 56 which leads the hot exhaust gases and vapors from the furnace 10' to an outside afterburner 58, wherein with the assist of burner means 60, the combustion process is completed. The afterburner 58 discharges the exhaust gases and vapors produced therein to the cooling apparatus 32 via line 62. The apparatus 32 is constructed and functions in the same manner as that described hereinbefore; and of course, a scrubber or quencher may be used. The cooling apparatus is fitted with an induced draft fan 34 which draws off the clean gases, and a recycle fan 40 which conducts a slip stream of water saturated gases from this apparatus through line 64 back to the furnace 10. The line 64 is provided with several branch lines 66 and 68 in order to conduct the slip stream of water saturated gases to several different hearths in the lower portion of the furnace. It will again be appreciated that the steam or water vapor provided by the quencher or scrubber provides the necessary steam for reaction with the carbon in the furnace, whereby to total overall heat requirements of the system are reduced because no outside steam is needed.

By way of example, the gases leaving the furnace may be at a temperature of the order of between about 600° to about 1600° F. and these are cooled in the quencher or scrubber to between about 150° and about 210° F., and preferably between about 180 and about 200° F., at which point they are adiabatically saturated so as to carry maximum moisture. The point in the quencher or scrubber at which the saturated gases should be withdrawn may readily be determined by those skilled in the art.

It will thus be seen that the present invention does indeed provide an improved system for regenerating and manufacturing activated carbon, which is superior in operability and efficiency as compared to prior art such systems.

Although certain particular embodiments of the invention are herein disclosed for purposes of explanation, various modifications thereof, after study of this specification, will be apparent to those skilled in the art to which the invention pertains.

I claim:

1. In a system for regenerating or manufacturing activated carbon, having a multiple hearth furnace and gas cooling means, a method comprising, in combination, the steps of introducing into the upper portion of said furnace granular activated carbon having a carbon content from about 45% to about 95%, progressively passing said granular activated carbon material downwardly through said furnace over said hearths and through a series of vertically disposed burning zones for burning undesired material therefrom, discharging the finished product from a lower portion of said furnace, passing the exhaust gases and vapors from an upper portion of said furnace through an auxiliary burning zone to complete the combustion process, conducting said exhaust gases and vapors from said auxiliary burning zone to said cooling means for adiabatic cooling of same to saturation, withdrawing clean gases from said cooling means, withdrawing a slip stream of water saturated gases from said cooling means conducting them to a lower hearth portion of said furnace, thereby providing a method of recycling gases wherein the water vapor from said gas cooling means is substantially the sole source of water vapor used for reaction with the carbon in the furnace.

2. A method of regenerating or manufacturing activated carbon according to claim 1, further comprising the steps of firing said furnace by an external combustion chamber, and wherein said step of withdrawing a slip stream of water saturated gases from said cooling means and conducting them to a lower hearth portion of said furnace includes the steps of conducting said gases to said combustion chamber and then passing a mixture of the gaseous products of fuel combustion and said slip stream of water saturated gases into the lower hearth portion of said furnace.

3. A method of regenerating or manufacturing activated carbon according to claim 1, further comprising the step of directly firing with burner means the hearths of said furnace.

4. A method of regenerating or manufacturing activated carbon according to claim 1, wherein said step of withdrawing a slip stream of water saturated gases from said cooling means and conducting them to a lower hearth portion of said furnace comprises the step of conducting said gases to a plurality of hearths in the lower hearth portion of said furnace.

5. A method of regenerating or manufacturing activated carbon according to claim 1, wherein said regenerating or manufacturing system includes an afterburner mounted on the top of said furnace, and said exhaust gases and vapors from the upper portion of said furnace are first passed to said afterburner prior to being passed to said cooling means.

6. A method of regenerating or manufacturing activated carbon according to claim 1, wherein an external afterburner is disposed between said furnace and said cooling means and said method comprises the steps of passing the exhaust gases and vapors from said furnace to said afterburner, and completing the combustion process of said gases in said afterburner, and passing the exhaust gases and vapors from said afterburner to said cooling means.

7. In a system for regenerating or manufacturing activated carbon, having a multiple hearth furnace and gas cooling means, a method comprising, in combination, the steps of introducing into the upper portion of said furnace granular activated carbon having a carbon content from about 45% to about 95%, progressively passing said granular activated carbon material downwardly through said furnace over said hearths and through a series of vertically disposed burning zones for burning undesired material therefrom, discharging the finished product from a lower portion of said furnace, passing the exhaust gases and vapors from an upper portion of said furnace through an auxiliary burning zone to complete the combustion process, conducting said exhaust gases and vapors at from about 600° to about 1600° F. from said auxiliary burning zone to said cooling means, cooling said gases and vapors in said cooling means to between about 150° to about 210° F. adiabatically to saturate same, withdrawing a slip stream of water saturated gases from said cooling means and conducting them to a lower hearth portion of said furnace, thereby providing a method of recycling gases wherein the water vapor from said cooling means is substantially the sole source of water vapor used for reaction with the carbon in the furnace, and discharging cooled gases from said cooler.

8. A method of regenerating or manufacturing activated carbon according to claim 7, wherein said exhaust gases and vapors are cooled in said cooling means to a temperature of between about 180° to about 200° F.

* * * * *

UNITED STATES PATENT AND TRADEMARK OFFICE
CERTIFICATE OF CORRECTION

PATENT NO. : 4,115,317
DATED : September 19, 1978
INVENTOR(S) : STUART S. SPATER It is certified that error appears in the above-identified patent and that said Letters Patent are hereby corrected as shown below:

```
Column 1, line 23, change "mixutre" to -- mixture --.
Column 2, line 13, change "bodes" to -- codes --.
Column 5, line 46, after "means" insert -- and --.
```

Signed and Sealed this

Ninth Day of January 1979

[SEAL]

Attest:

RUTH C. MASON
*Attesting Officer*

DONALD W. BANNER
*Commissioner of Patents and Trademarks*